O. C. FLOWER.
AGRICULTURAL IMPLEMENT.
APPLICATION FILED FEB. 14, 1918.
1,303,051.
Patented May 6, 1919.
2 SHEETS—SHEET 1.
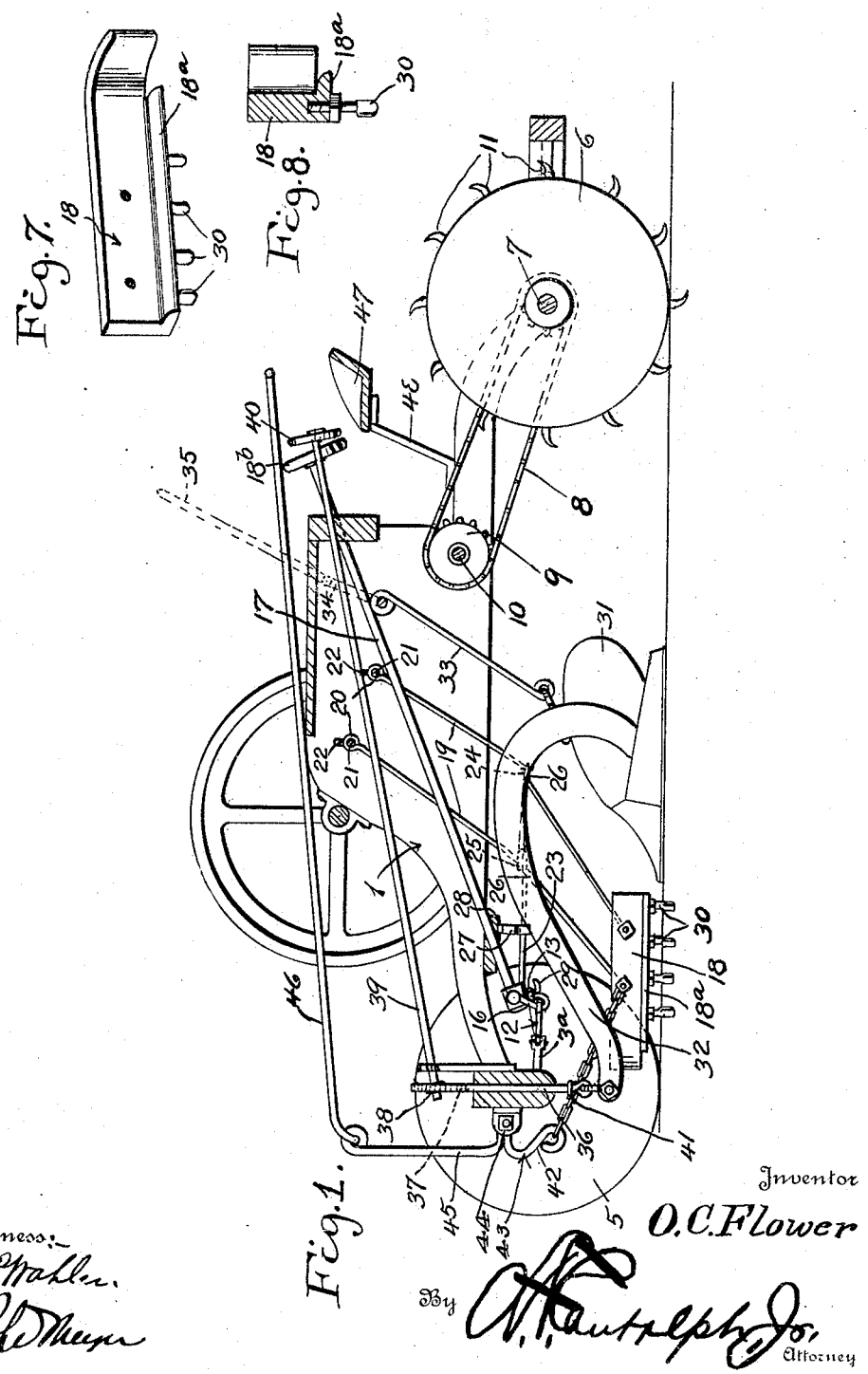
Inventor
O. C. Flower

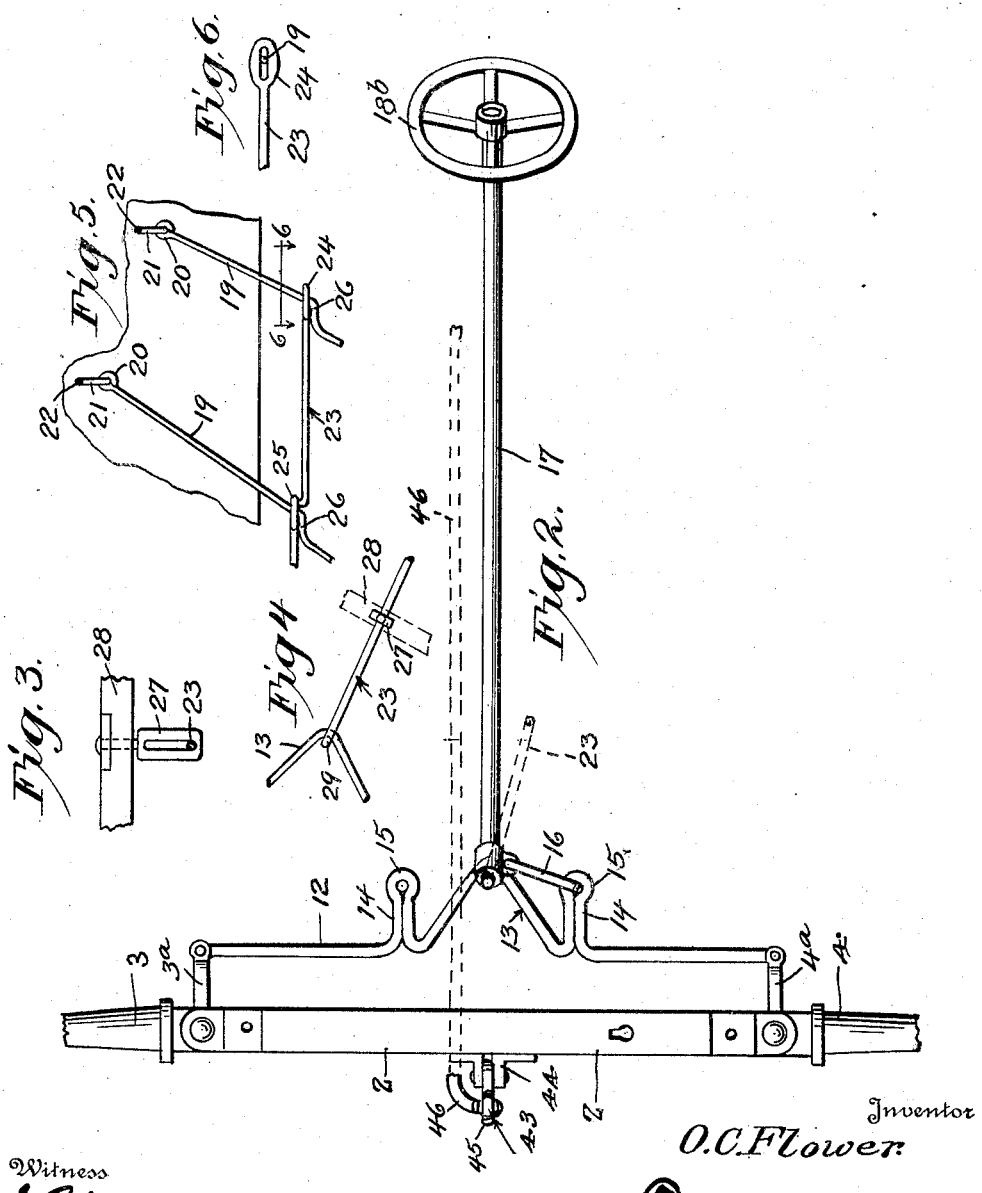

UNITED STATES PATENT OFFICE.

OWEN C. FLOWER, OF SAN FRANCISCO, CALIFORNIA.

AGRICULTURAL IMPLEMENT.

1,303,051.

Specification of Letters Patent.

Patented May 6, 1919.

Application filed February 14, 1918. Serial No. 217,145.

*To all whom it may concern:*

Be it known that I, OWEN C. FLOWER, a citizen of the United States, residing at San Francisco, in the county of San Francisco and State of California, have invented certain new and useful Improvements in Agricultural Implements; and I do hereby declare the following to be a full, clear, and exact description of the invention, such as will enable others skilled in the art to which it appertains to make and use the same.

This invention relates to agricultural machines, and more particularly to means for automatically steering a plow so as to insure the cutting of straight parallel furrows.

One of the main objects of the invention is to provide an agricultural machine provided with plowing means and having simple and efficient means for automatically steering the machine so as to insure the cutting of straight furrows by the plow.

A further object is to provide automatic steering means connected to the steering gear of the plow in such a way as to actuate said gear when the automatic steering means is employed, this automatic steering means being disconnected from the steering gear so as to permit the machine to be steered through the medium of the usual steering post and hand wheel.

Further objects will appear from the detailed description.

In the drawings:

Figure 1 is a longitudinal section through a plowing machine of substantially conventional construction with a steering means constructed in accordance with my invention applied.

Fig. 2 is a top plan view of the steering gear.

Fig. 3 is a detail front view of the means for supporting the steering rod.

Fig. 4 is a detail of the connections between the steering rod and the connecting rod for the wheel spindles.

Fig. 5 is a detail of the means for supporting the furrow shoe.

Fig. 6 is a section taken substantially on line 6—6 of Fig. 5.

Fig. 7 is a detail perspective side view of the furrow shoe.

Fig. 8 is a vertical section through the same.

The plow frame designated generally by 1 may be of any suitable or standard construction and is provided at its forward end with a supporting axle 2 at the ends of which are mounted the spindles 3 and 4 for rocking movement about vertical axes, in the usual manner. These spindles are adapted to receive suitable rollers or wheels 5 mounted thereon for supporting the frame. A propelling roller 6 is secured on a shaft 7 rotatably supported at the rear of frame 1, this shaft being provided with a sprocket wheel connected by a sprocket chain 8 to a sprocket wheel 9 secured on a shaft 10 which may be rotated by means of an internal combustion engine (not shown) carried by the frame 1, or in any other suitable manner. As will be noted, roller 6 is provided with a plurality of outwardly projecting gripping elements 11 which act, when the roller is rotated, to propel the plow.

The spindles 3 and 4 are provided with rearwardly projecting fingers $3^a$ and $4^a$, respectively. The rearward ends of these fingers are pivotally secured to the ends of a connecting rod 12, the intermediate portion of which is bent to provide a rearwardly directed central V-shaped element 13 and rearwardly directed elements 14 having at their rearward ends eyes 15. The eye 15 of one of the elements 14 is connected by a link 16 to the lower end of a steering post 17 provided at its upper end with a hand wheel $18^b$ by means of which the connecting rod 12 may be shifted so as to steer the machine in the well known manner. It will be understood, of course, that the steering post may be connected to rod 12 in any suitable manner other than that shown, the steering gear so far disclosed being of substantially standard construction.

A furrow shoe 18 of substantially rectangular outline is suspended by means of supporting rods 19 which are pivoted thereto at their lower ends from the frame 1. Each of these rods is provided, at its upper end, with an eye 20 which is vertically disposed and directed longitudinally of the frame, this eye engaging snugly through an eye 21 carried by a rod 22 extending transversely of the frame. In this manner, the supporting rods 19 are secured at their upper ends to the frame by a universal connection so as to be freely movable forwardly and rearwardly, and transversely of this frame. The rods 19 are connected by a steering rod 23 which extends longitudinally of the frame 1, this steering rod being provided at its rearward end with an eye 24 which is elongated or of substantially flattened elliptical shape and is disposed longitudinally of the rod, this eye snugly receiving the rearward supporting rod 19. The rod 23 is provided with an intermediate eye 25 similar to eye 24 which snugly receives the forward supporting rod 19. As will be noted, the steering rod is disposed in a substantially horizontal position, the eye 24 resting upon offsets or shoulders 26 formed in the rods 19 intermediate the ends thereof. The steering rod projects forwardly of supporting rods 19 through a supporting eye 27 depending from, and pivotally secured in, a brace bar 28 extending transversely of the frame. This supporting eye is provided with a vertical slot which snugly receives the rod 23, the eye being mounted for rocking movement about a vertical axis. At its forward end rod 23 is provided with a downwardly directed hook 29 which engages through the central V-shaped element 13 of connecting rod 12 at the apex thereof. The shoe 18 is provided with a smooth or plane vertical face which, as will be understood, is adapted to engage the land side of the furrow, and this shoe is further provided with an inwardly projecting flange 18ª carrying a plurality of downwardly directed sub-soiling members 30 which are disposed at an angle to the shoe and act to hold this shoe in engagement with the land side of the furrow while also functioning as sub-soiling members. The shoe 18 will fit snugly against the land side of the furrow and will act through the rods 19 to rock steering rod 23 in accordance with changes in direction of the furrow, the steering rod being rocked about the axis of the supporting eye 27. This rocking movement of the steering rod brings the bill of hook 29 at the forward end thereof into engagement with one or the other of the rearwardly converging arms of the V-shaped element 13, depending upon the direction in which the furrow shoe is moved, this steering rod thus serving to move the connecting rod 12 in the opposite direction to the direction of movement of the shoe so as to maintain the plow in proper position to cut a straight furrow.

The plow 31 is carried by a plow beam 32 suspended from frame 1 by a link 33 the upper end of which is swiveled to a crank shaft 34 rockable on the frame which may be actuated by a hand lever 35. The forward end of plow beam 32 is swiveled to the lower end of an adjusting bar 36 slidable through the axle 2, this bar being provided on its upper end portion with a rack bar 37 engaged by a pinion 38 secured on the lower end of an adjusting shaft 39 on the upper end of which is secured a hand wheel 40. As will be understood, the shoe 18 engages the land side of a previously cut furrow so as to maintain the plow 31 in parallelism therewith thus insuring that the furrows which are cut or turned will be straight and parallel.

Shoe 18 is connected at its central portion by means of a chain 41 to the lower arm 42 of a lever 43 which is rockably mounted in a supporting bracket 44 secured on the front of axle 2, this lever being movable about a horizontal axis. The upper arm 45 of the lever 43 is connected to a pull rod 46 extending rearwardly of the machine to within a short distance of the operator's seat 47 supported on the frame by a standard 48 of usual construction. By means of pull rod 46, lever 43 may be rocked in such direction as to raise the shoe 18 into inoperative position above the ground surface. If desired, suitable means may be provided for securing this rod 46 in rearward position so as to maintain the shoe raised. When shoe 18 is raised, the supporting rods 19 are rocked upwardly and forwardly about the eyes 21 of rods 22. This results in causing upward and forward movement of steering rod 23 so as to disengage the hook 29 thereof from about the V-shaped element 13 of connecting rod 12 simultaneously with raising of the shoe into inoperative position. This results in releasing the steering gear so that the machine may be steered manually through the medium of steering post 17 and wheel 18 without interference by the automatic steering means above described. When shoe 18 is lowered into operative position, the supporting rods 19 will act to return the steering rod 23 to operative position so that the hook 29 thereof engages about the element 13 so as to actuate the steering gear in accordance with movement of the shoe in the manner previously described.

It will be evident that there may be slight changes made in the construction and arrangement of the different parts of my invention without departing from the field and scope of the same, and I intend to include all such variations, as fall within the scope of the appended claims, in this application in which a preferred form only of my invention is disclosed.

What is claimed is:—

1. The combination with an agricultural machine including a steering gear for manually steering said machine, of a furrow shoe adapted to engage the land side of a furrow formed by a plow carried by said machine, rods depending from the frame of the machine and supporting said shoe so as to be movable vertically so as to be adjusted toward and away from the ground surface, a steering rod carried by said supporting rod and loosely connected to the connecting rod of said steering gear, said steering rod being fulcrumed intermediate its ends for rocking movement about a vertical axis, and connections between the forward end of the steering rod and the connecting rod of the steering gear for shifting said connecting rod in accordance with movement of the steering rod, said connections being adapted to be disengaged from the connecting rod when the shoe is raised into inoperative position so as to permit the steering gear to be operated manually independently of said steering rod.

2. The combination with an agricultural machine including a steering gear for manually steering said machine, of supporting rods depending from the frame of the machine and secured thereto at their upper ends by universal connections, a furrow shoe carried by said rods at the lower ends thereof so as to be movable vertically, said shoe being also movable transversely and longitudinally of the frame of said machine, a substantially horizontally disposed steering rod extending longitudinally of the machine and loosely connected to said supporting rods, the supporting rods being provided with means for maintaining the steering rod in substantial horizontal position, a vertically disposed eye slidably receiving the steering rod, said eye being mounted for movement about a vertical axis, the steering rod being provided at its forward end with a downwardly directed open hook and the connecting rod of the steering gear being provided with a substantially V-shaped rearwardly directed element engaged by said hook so as to cause movement of the connecting rod in accordance with lateral movement of the forward portion of the steering rod when said rod is rocked about the axis of said eye, and means for raising and lowering said shoe, the supporting rods and the steering rod being so related to each other and to the shoe as to disengage the hook of said steering rod from the V-shaped element of the connecting rod when said shoe is raised into inoperative position so as to permit the steering gear to be operated manually independently of the steering rod.

In testimony whereof I affix my signature in presence of two witnesses.

OWEN C. FLOWER.

Witnesses:
R. L. HUSTED,
B. F. EMERY.

Copies of this patent may be obtained for five cents each, by addressing the "Commissioner of Patents, Washington, D. C."